United States Patent
Matsuda et al.

(10) Patent No.: US 10,051,083 B2
(45) Date of Patent: Aug. 14, 2018

(54) COMMUNICATION SYSTEM, COMMUNICATION DEVICE AND PROGRAM

(75) Inventors: Makoto Matsuda, North Brunswick, NJ (US); Katsunori Enomoto, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/403,208

(22) Filed: Apr. 13, 2006

(65) Prior Publication Data

US 2008/0034312 A1     Feb. 7, 2008

(30) Foreign Application Priority Data

Apr. 15, 2005 (JP) ................................ 2005-118491

(51) Int. Cl.
*G06F 3/00* (2006.01)
*H04L 29/08* (2006.01)

(52) U.S. Cl.
CPC ................................... *H04L 67/36* (2013.01)

(58) Field of Classification Search
CPC .. G06F 3/0481; G06F 3/0482; G06F 3/04842; G06F 17/40; G06F 3/1285;

(Continued)

(56) References Cited

U.S. PATENT DOCUMENTS 5,413,419 A * 5/1995 Oami et al. ................... 400/61
5,621,539 A * 4/1997 Brown ................ G07F 17/0014
                                                  358/400

(Continued)

FOREIGN PATENT DOCUMENTS

CN      1244691 A      2/2000
JP      160829         6/1997

(Continued)

OTHER PUBLICATIONS

State Intellectual Property Office of P.R. China; Notification of the Second Office Action in Chinese Patent Application No. 200610074399.3 dated Jan. 8, 2010.

(Continued)

*Primary Examiner* — Di Xiao
(74) *Attorney, Agent, or Firm* — Baker Botts L.L.P.

(57) ABSTRACT

There is provided a communication system in which a data sending device and a data receiving device are connected to each other, the data sending device has a function of sending data to be displayed to the data receiving device and the data receiving device has a function of receiving the data to be displayed. In the communication system, the data receiving device includes a display on which information is displayed, an information display control unit that displays information based on the data to be displayed on the display if the data receiving device receives the date to be displayed from the data sending device, and a state display control unit that decides whether to display state information indicating that the data receiving device is in a waiting state for the data to be displayed when the data receiving device changes to the waiting state, in accordance with a type of the information displayed on the display.

9 Claims, 9 Drawing Sheets

(58) Field of Classification Search
CPC ............. G06F 11/3013; G06F 11/3055; G06F 11/324; G06F 1/3209; G06F 3/1253; G06F 3/1259; G06F 3/1288
USPC ........................................................ 715/772
See application file for complete search history.

(56) References Cited

U.S. PATENT DOCUMENTS

| | | | | |
|---|---|---|---|---|
| 5,959,998 | A * | 9/1999 | Takahashi et al. | 370/431 |
| 6,285,466 | B1 * | 9/2001 | Chimura | H04N 1/00204 358/404 |
| 6,295,139 | B1 * | 9/2001 | Yamauchi et al. | 358/443 |
| 6,318,982 | B1 * | 11/2001 | Fujii et al. | 418/55.4 |
| 6,518,982 | B2 * | 2/2003 | Dow et al. | 715/772 |
| 6,819,341 | B2 * | 11/2004 | Dow et al. | 715/772 |
| 2001/0014908 | A1 * | 8/2001 | Lo | H04N 1/00236 709/203 |
| 2001/0033300 | A1 | 10/2001 | Dow et al. | |
| 2001/0034806 | A1 | 10/2001 | Dow et al. | |
| 2002/0054119 | A1 * | 5/2002 | Dow | H04N 1/00127 715/772 |
| 2002/0057455 | A1 * | 5/2002 | Gotoh | G06F 3/1207 358/1.15 |
| 2003/0105813 | A1 * | 6/2003 | Mizutani | H04L 29/06 709/203 |
| 2003/0151777 | A1 * | 8/2003 | Nishio | H04N 1/00204 358/468 |
| 2004/0192260 | A1 * | 9/2004 | Sugimoto | G06F 11/1456 455/412.1 |
| 2005/0157326 | A1 * | 7/2005 | Lee | H04N 1/32609 358/1.14 |
| 2005/0200891 | A1 * | 9/2005 | Cohen | H04N 1/0022 358/1.15 |
| 2005/0267943 | A1 * | 12/2005 | Castaldi | G03B 19/00 709/206 |
| 2008/0034312 | A1 * | 2/2008 | Matsuda | H04L 67/36 715/772 |
| 2008/0082261 | A1 * | 4/2008 | Tengler et al. | 701/210 |

FOREIGN PATENT DOCUMENTS

| | | |
|---|---|---|
| JP | 2002-091559 A | 3/2002 |
| JP | 2005-055846 A | 3/2005 |

OTHER PUBLICATIONS

Japan Patent Office; Notification of Reasons of Rejection in Japanese Patent Application No. 2005-118491, dated Mar. 16, 2010.
Patent Office of the People's Republic of China, Notification of the Third Office Action for Chinese Patent Application No. 200610074399.3, dated Dec. 23, 2011.
State Intellectual Property Office of the People's Republic of China, Final Rejection for Chinese Patent Application No. 200610074399.3 (counterpart Chinese patent application), dated Oct. 10, 2012.
Japan Patent Office, Decision of Rejection for Patent Application No. JP 2005-118491, dated Oct. 26, 2010.

* cited by examiner

FIG.9A

STATE A

| LAYER 1 | LAYER 2 | LAYER 3 |
|---|---|---|
| Registration xxxx | User Name Address | =aichi ■ |
| Select & Set | Select & Set | Input & Set |

FIG.9B

STATE B

| LAYER 1 |
|---|
| Processing... |
| Please Wait |

FIG.9C

STATE C

| LAYER 1 | LAYER 2 |
|---|---|
| Service 1 Service 2 | Application 1 Application 2 |
| Select & Set | Select & Set |

FIG.9D

STATE D

| LAYER 1 |
|---|
| Processing... |
| Please Wait |

FIG.10A  STATE A
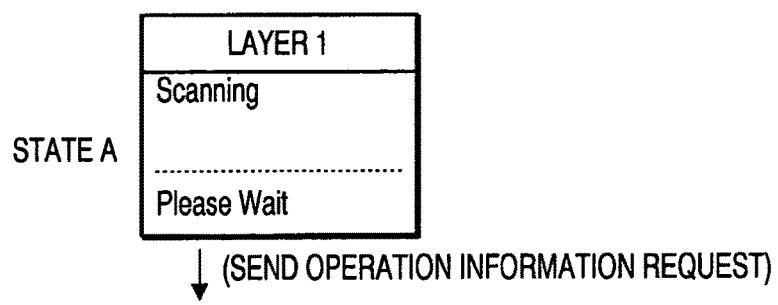
(SEND OPERATION INFORMATION REQUEST)
FIG.10B  STATE B
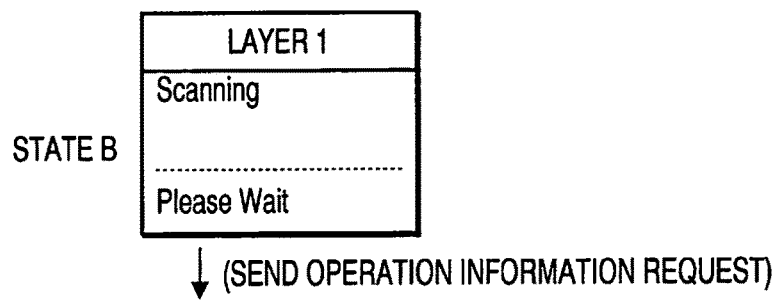
(SEND OPERATION INFORMATION REQUEST)
FIG.10C  STATE C
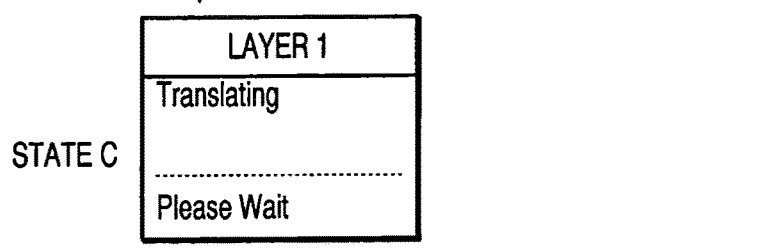

COMMUNICATION SYSTEM, COMMUNICATION DEVICE AND PROGRAM

CROSS-REFERENCE TO RELATED APPLICATION

This application claims priority under 35 U.S.C. § 119 from Japanese Patent Application No. 2005-118491, filed on Apr. 15, 2005. The entire subject matter of the application is incorporated herein by reference.

FIELD

Aspects of the present invention relate to a communication system in which data is transmitted from a data sending device having a function of sending data to a data receiving device having a function of receiving data, and to such devices provided in the communication system.

BACKGROUND

Communication systems such as a client server system in which a data sending device and a data receiving device are connected to each other via a network to transmit data from the data sending device to the data receiving device have been widely used.

In Japanese Patent Provisional Publication No. HEI 9-160829 (hereafter, referred to as JP H9-160829A), an example of such a client server system is disclosed. In the client server system disclosed in JP H9-160829A, a client device caches data transmitted from a server. The client device executes a temporary process based on the cached data while checking whether data on the server corresponding to the cached data is updated. If the client device judges that the data on the server corresponding to the cached data is not updated, the client device defines the temporary process as a definitive process and continues to execute a remaining part of the definitive process. If the data on the server corresponding to the cached data is updated on the server, the client device deletes an execution result of the temporary process.

In the case where a data receiving device receives display data from a data sending device and the data receiving device executes a process for displaying information corresponding to the display data, if a waiting time required for receiving the display data from the data sending device is relatively long due to communication speed or a volume of data traffic, a time for displaying information based on the display data on a display of the data receiving device becomes long, thereby causing a user of the client device to become anxious.

The data receiving device may be configured to tentatively display information based on the data cashed in the data receiving device when the data receiving device changes to a data receiving state for receiving display data, as in the case of the client server system disclosed in JP H9-160829A. However, in this case, if the data cached in the data receiving device is older than the corresponding display data on the server (i.e., the data to be displayed is already updated on the server), old information is displayed on the data receiving device tentatively, which confuses a user of the data receiving device.

As an alternative to such a configuration, the data receiving device may be configured to display information representing a waiting state when the data receiving device changes to the data receiving state for receiving display data, so as to notify the user of information indicating that the data receiving device is in the data receiving state. However, in this case, frequency of displaying information indicating that the data receiving device is in the data receiving state may increase, by which the original purpose of displaying information based on the display data transmitted from the data sending device may be deteriorated.

SUMMARY

Aspects of the present invention are advantageous in that a communication system, in which data is transmitted from a data sending device to a data receiving device and information based on the received data is displayed on the data receiving device, capable of preventing the essential function of displaying information based on received data from being deteriorated, while also preventing a user from becoming anxious about the essential function.

BRIEF DESCRIPTION OF THE ACCOMPANYING DRAWINGS

FIGS. 9A to 9D illustrate examples of onscreen representation on a display of the MFP in a situation where input/selection information is displayed on the display.

FIGS. 10A to 10C are examples of onscreen representation regarding the caser where status information is displayed on the display.

DETAILED DESCRIPTION

General Overview

Figure 1:
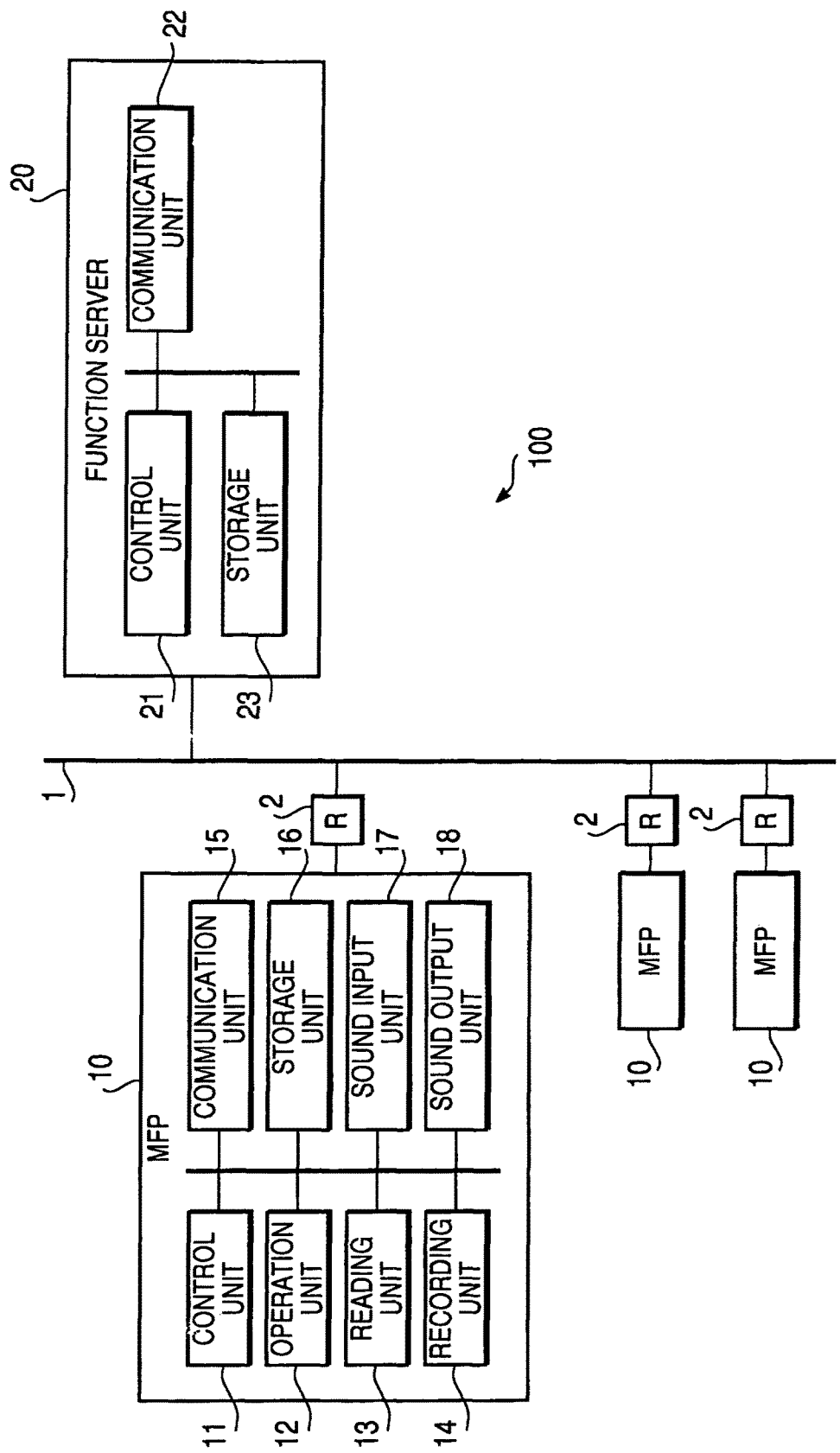
FIG. 1 is a block diagram of a communication system according to at least one aspect of the invention.

According to an aspect of the invention, there is provided a communication system in which a data sending device and a data receiving device are connected to each other, the data sending device has a function of sending data to be displayed to the data receiving device and the data receiving device has a function of receiving the data to be displayed. In the communication system, the data receiving device includes a display on which information is displayed, an information display control unit that displays information based on the data to be displayed on the display if the data receiving device receives the date to be displayed from the data sending device, and a state display control unit that decides whether to display state information indicating that the data receiving device is in a waiting state for the data to be displayed when the data receiving device changes to the waiting state, in accordance with a type of the information displayed on the display.

Although whether it is necessary to notify a user of the state information varies depending on the type of the information being displayed on the display, the above mentioned data receiving device is configured to decide whether to display the state information in accordance with the type of the information displayed on the display. Therefore, it is possible to prevent the essential function of displaying information on the display from being deteriorated, while also preventing a user from becoming anxious about the essential function of displaying information.

Optionally, the state display control unit may display the state information on the display in place of the information based on the data to be displayed when the data receiving device changes to the waiting state, if the information displayed on the display is first type information. In this case, the state display control unit may maintain the information based on the data to be displayed on the display even when the data receiving device changes to the waiting state, if the information displayed on the display is second type information which is different in type from the first type information.

With this configuration, onscreen representation can be changed depending on whether the information being displayed on the display is the first type information or the second type information.

Still optionally, the data receiving device may include an input unit configured to accept an externally inputted command. In this case, the first type information may be information used to accept the externally inputted command through the input unit.

In the case where the information (e.g., information for accepting a text input or accepting a selection of an item) for accepting the external input is displayed on the display, the state information is displayed on the device when the data receiving device changes to the waiting state. Therefore, it is possible to get a user to notice the switching to the waiting state. It is also possible to prevent a user to become anxious about the data receiving device due to the fact that the user becomes unable to notice the switching to the waiting state.

It is also possible to prevent the function of displaying information from being deteriorated by the switching of information because if the information for accepting the externally inputted command is displayed on the display, the frequency with which the information on the display is updated regardless of the user's intension is relatively low.

Still optionally, the second type information may be information indicating a status of the data sending device.

With this configuration, it is possible to prevent the function of displaying information from being deteriorated. Since it is preferable to frequently receive the status of the data sending device, the above mentioned configuration (i.e., if the data to be displayed is the status, the information is maintained on the display) is able to enhance such an advantage in such a situation of the high frequency of receiving the status. It is also possible to prevent a user from becoming anxious about the data receiving device because the necessity for notifying the user of the switching to the waiting state is relatively low if the displayed information is the status.

Still optionally, the data receiving device may include a data request control unit that performs a request process for requesting transmission of the data to be displayed from the data sending device. In this case, the waiting state of the data receiving device may correspond to a state in which the request process is performed by the data request control unit.

Such a configuration enables the communication system to be applied to a client server system in which a client functions as the data receiving device and a server functions as the data sending device.

According to another aspect of the invention, there is provided a communication device, which is provided with a communication unit that performs data communication with an external device, a display on which information is displayed, an information display control unit that displays information based on data to be displayed on the display if the date to be displayed from the external device is received through the communication unit, and a state display control unit that decides whether to display state information indicating that the communication device is in a waiting state for the data to be displayed when the communication device changes to the waiting state, in accordance with a type of the information displayed on the display.

Although whether it is necessary to notify a user of the state information varies depending on the type of the information being displayed on the display, the above mentioned communication device is configured to decide whether to display the state information in accordance with the type of the information displayed on the display. Therefore, it is possible to prevent the essential function of displaying information on the display from being deteriorated, while also preventing a user from becoming anxious about the essential function of displaying information.

Optionally, the state display control unit displays the state information on the display in place of the information based on the data to be displayed when the communication device changes to the waiting state, if the information displayed on the display is first type information. In this case, the state display control unit maintains the information based on the data to be displayed on the display even when the communication device changes to the waiting state, if the information displayed on the display is second type information which is different in type from the first type information.

With this configuration, onscreen representation can be changed depending on whether the information being displayed on the display is the first type information or the second type information.

Still optionally, the communication device may include an input unit configured to accept an externally inputted command. In this case, the first type information may be information used to accept the externally inputted command through the input unit.

In the case where the information (e.g., information for accepting a text input or accepting a selection of an item) for accepting the external input is displayed on the display, the state information is displayed on the communication device when the communication device changes to the waiting state. Therefore, it is possible to get a user to notice the switching to the waiting state. It is also possible to prevent a user to become anxious about the communication device due to the fact that the user becomes unable to notice the switching to the waiting state.

It is also possible to prevent the function of displaying information from being deteriorated by the switching of information because if the information for accepting the externally inputted command is displayed on the display, the frequency with which the information on the display is updated regardless of the user's intension is relatively low.

Still optionally, the second type information may be information indicating a status of the external device.

With this configuration, it is possible to prevent the function of displaying information from being deteriorated. Since it is preferable to frequently receive the status of the external device, the above mentioned configuration (i.e., if the data to be displayed is the status, the information is maintained on the display) is able to enhance such an advantage in such a situation of the high frequency of receiving the status. It is also possible to prevent a user from becoming anxious about the communication device because the necessity for notifying the user of the switching to the waiting state is relatively low if the displayed information is the status.

Still optionally, the communication device may include a data request control unit that performs a request process for requesting transmission of the data to be displayed from the external device. In this case, the waiting state of the communication device may correspond to a state in which the request process is performed by the data request control unit.

According to another aspect of the invention, there is provided a computer program product comprising computer readable instructions that cause a computer to perform data communication with an external device, to display information based on data to be displayed on a display if the date to be displayed from the external device is received, and to decide whether to display state information indicating that the computer is in a waiting state for the data to be displayed when the computer changes to the waiting state, in accordance with a type of the information displayed on the display.

Although whether it is necessary to notify a user of the state information varies depending on the type of the information being displayed on the display, the above mentioned computer is configured to decide whether to display the state information in accordance with the type of the information displayed on the display. Therefore, it is possible to prevent the essential function of displaying information on the display from being deteriorated, while also preventing a user from becoming anxious about the essential function of displaying information.

Optionally, the state information may be displayed on the display in place of the information based on the data to be displayed when the computer changes to the waiting state, if the information displayed on the display is first type information. In this case, the information based on the data to be displayed may be maintained on the display even when the computer changes to the waiting state, if the information displayed on the display is second type information which is different in type from the first type information.

With this configuration, onscreen representation can be changed depending on whether the information being displayed on the display is the first type information or the second type information.

Still optionally, the computer readable instructions may further cause the computer to accept an externally inputted command through an input unit. In this case, the first type information may be information used to accept the externally inputted command through the input unit.

In the case where the information (e.g., information for accepting a text input or accepting a selection of an item) for accepting the external input is displayed on the display, the state information is displayed on the computer when the computer changes to the waiting state. Therefore, it is possible to get a user to notice the switching to the waiting state. It is also possible to prevent a user to become anxious about the computer due to the fact that the user becomes unable to notice the switching to the waiting state.

It is also possible to prevent the function of displaying information from being deteriorated by the switching of information because if the information for accepting the externally inputted command is displayed on the display, the frequency with which the information on the display is updated regardless of the user's intension is relatively low.

Still optionally, the second type information may be information indicating a status of the external device.

With this configuration, it is possible to prevent the function of displaying information from being deteriorated. Since it is preferable to frequently receive the status of the external device, the above mentioned configuration (i.e., if the data to be displayed is the status, the information is maintained on the display) is able to enhance such an advantage in such a situation of the high frequency of receiving the status. It is also possible to prevent a user from becoming anxious about the computer because the necessity for notifying the user of the switching to the waiting state is relatively low if the displayed information is the status.

Still optionally, the computer readable instructions may further cause the computer to perform a request process for requesting transmission of the data to be displayed from the external device. In this case, the waiting state of the computer corresponds to a state in which the request process is performed.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

Illustrative Embodiments

Hereafter, an illustrative embodiment according to the invention will be described with reference to the accompanying drawings.

FIG. 1 is a block diagram of a communication system 100 according to an embodiment of the invention. The communication system 100 includes multifunction peripherals (MFPs) (10, 10, . . . ), and a function server 20, which are connected to each other for data communications via a Wide Area Network (the Internet 1 in this embodiment).

In the communication system 100, MFPs (10, 10, . . . ) are connected to the Internet 1 via respective broadband routers 2. Since the MFPs (10, 10, . . . ) have the same function, one of them is frequently picked up for explanations about the function of each MFP 10.

In a normal setting mode (i.e., a default setting), all of the ports of each router 2 are closed. If a request is transmitted from an inside network to an outside network (e.g., from an MFP 10 to the internet 1), the router 2 allows only a packet corresponding to a response to the request to pass therethrough. That is, the router 2 functions as a firewall configured such that, with regard to packets proceeding from the outside network toward the inside network, only packets corresponding to responses to requests issued from the inside network are allowed to enter the inside network, while packets not corresponding to the responses to the requests issued from the inside network are blocked so that improper accesses to the MFP 10 are blocked.

In the communication system 100, HTTP (HyperText Transfer Protocol) 1.1 is used in communications between the MFP 10 and the function server 20. That is, bidirectional communications are performed using messages accompanying HTTP requests and responses.

Hereafter, the configuration of the MFP 10 will be described. The MFP 10 includes functions as a telephone (a voice communication function), a scanner, a printer, a copying device, and a facsimile device. As shown in FIG. 1, the MFP 10 includes a control unit 11, an operation unit 12, a reading unit 13, a recording unit 14, a communication unit 15, a storage unit 16, a sound input unit 17 and a sound output unit 18.

The control unit 11 includes a microcomputer chip in which a CPU, a ROM, and a RAM are embedded, and has a function of controlling internal components of the MFP 10. In the ROM, various programs (e.g., programs shown in FIGS. 3 to 5) to be executed by the CPU are stored.

Figure 2:
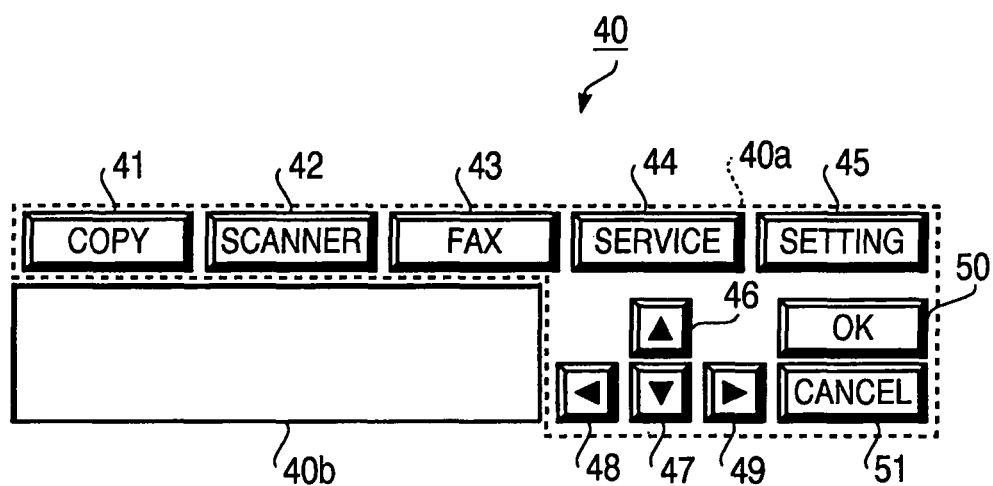
FIG. 2 is a plan view of a operation panel of an MFP in the communication system 100.

The operation unit 12 includes an operation panel 40 (see FIG. 2). The operation panel 40 includes an input unit 40a through which user operations are conducted, and a display 40b on which various types of information can be displayed. The input unit 40a includes a copy key 41, a scanner key 42, a FAX key 43, a service key 44, a setting key 45, four direction (upward, downward, leftward and rightward) keys 46, 47, 48 and 49, an OK key 50, and a cancel key 51. The operation unit 12 sends commands inputted by a user through the input unit 40a to the control unit 11, and displays information (e.g., a message) on the display 40b in accordance with commands from the control unit 11.

The reading unit 13 includes an image sensor, such as a CCD (Charge Coupled Device) or a CIS (Contact Image sensor), and is able to read an image from an original and generates image data of the obtained image in accordance with a command from the control unit 11. The recording unit 14 feeds sheets of paper one by one from a sheet supply cassette (sheet supply tray) to a recording portion, and prints an image corresponding to image data according to an image recording manner (e.g., laser transferring or inkjet recording), based on a command from the control unit 11. After printing, the sheet is discharged to a discharge tray.

The communication unit 15 performs communication processes for interfacing the MFP 10 with the Internet 1. The storage unit 16 includes a non-volatile RAM in which various types of data can be stored. The sound input unit 17 includes a microphone of a handset and is able to obtain voice from the microphone and to generate voice data (e.g., PCM data) representing the obtained voice. The sound output unit 18 includes a speaker of the handset or a speaker located in a main body of the MFP 10, and is able to output sound through the speaker of the handset or the speaker located in the main body of the MFP 10.

Hereafter, the configuration of the function server 20 will be described. The function server 20 is configured to receive a request from an MFP 10 and to provide a service for the MFP 10 which issued the request. As shown in FIG. 1, the function server 20 includes a control unit 21, a communication unit 22 and a storage unit 23.

The control unit 21 includes a microcomputer chip in which a CPU, a ROM, and a RAM are embedded, and has a function of controlling internal components of the function server 20. In the ROM, various programs (e.g., programs shown in FIGS. 6 to 8) to be executed by the CPU are stored. The communication unit 22 performs communication processes for interfacing the function server 20 with the Internet 1.

The storage unit 23 includes a hard disk in which various types of data can be stored. Service programs executed for providing services to the MFP 10 are stored in the storage unit 23. That is, service programs respectively corresponding to the various types of services to be provided to the MFP 10 are stored in the storage unit 23. If one of programs in the storage unit 23 is executed by the control unit 21, a service corresponding to the program is provided to the MFP 10.

The services which the function server 20 is able to provide for the MFP 10 includes a translation copy service, a news delivery service, and a reading aloud service. In the translation copy service, text information read from an original by the reading unit 14 of the MFP 10 is translated, print data (i.e., image data corresponding to an image to be printed) representing the translated text is generated, and the image corresponding to the print data is printed on a recording sheet by the recording unit 14 of the MFP 10. In the news delivery service, news data is obtained from a predetermined database, print data representing the obtained news data is generated, and the image corresponding to the print data is printed on a recording sheet by the recording unit 14 of the MFP 10.

In the reading aloud process, text read from an original by the reading unit 13 of the MFP 10 is converted into voice data, and voice corresponding to the voice data is reproduced through the sound output unit 18.

Hereafter, processes executed by the MFP 10 and the function server 20 will be explained.

Figure 3:
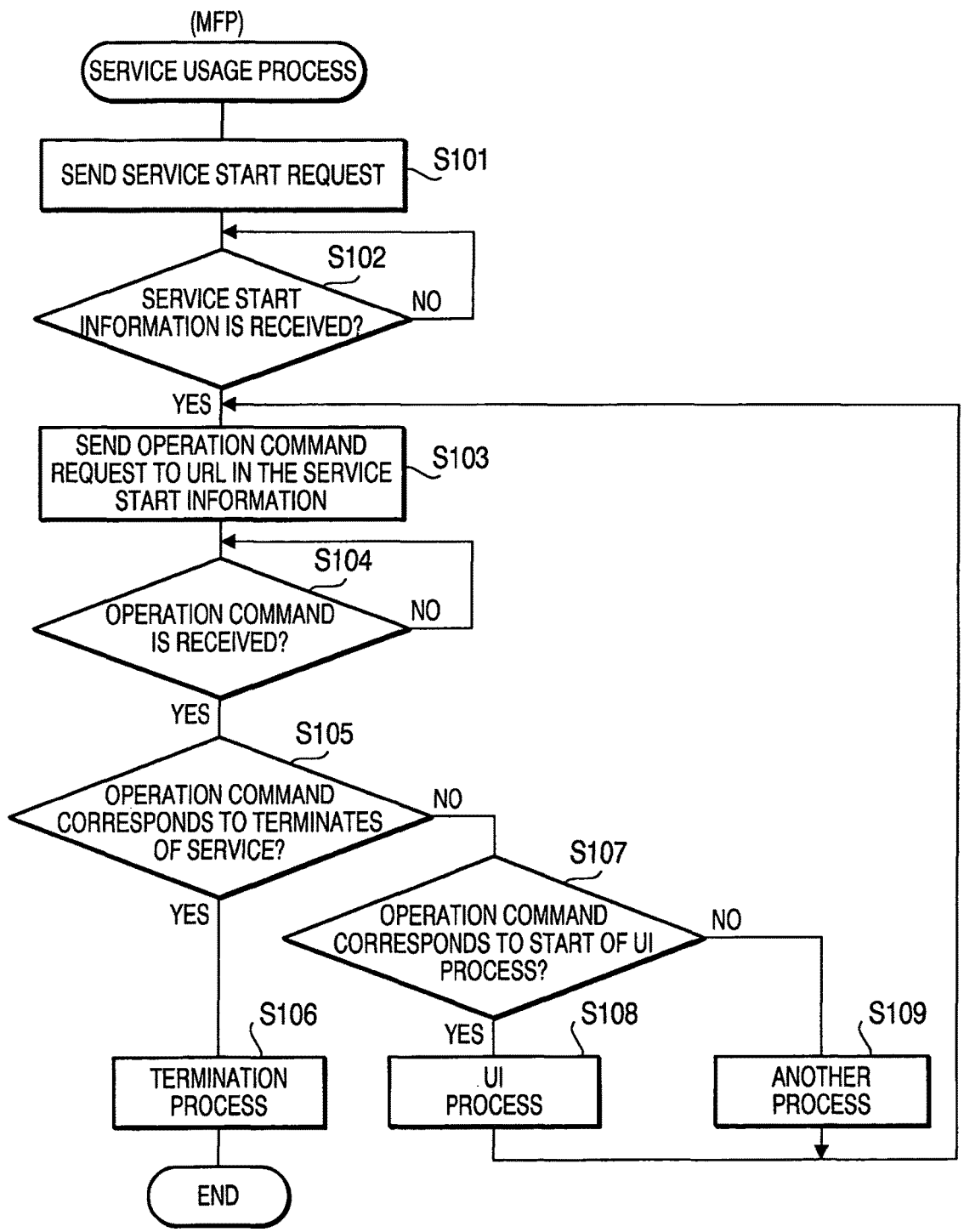
FIG. 3 is a flowchart illustrating a service usage process executed under control of the MFP according to at least one aspect of the invention.

A service usage process to be executed under control of the control unit 11 of the MFP 10 will be explained with reference to FIG. 3. The service usage process is initiated when a user operation for selecting a service is conducted on a service selection screen (which allows a user to select a desirable service from the various services which the function server 20 is able to provide) displayed on the display 40b by pressing the service key 44 of the input unit 40a.

First, the CPU 11 sends a service start request for starting the selected service to the function server 20 (step S101). In step S102, the control unit 11 judges whether service start information which is sent by the function server 20 as a reply to the service start request is received. The control unit 11 waits until the service start information is received (S102: NO). If the service start information is received (S102: YES), control proceeds to step S103. The service start information includes a client ID which the function server 20 uses to identify a client, and a destination URL (representing a destination address of a target to which a request for a service is sent) for an operation command request. As described later, the service start command is sent from the function server 20 to the MFP 10, which issued the service start request, in step S501 of a service process (see FIG. 7).

In step S103, the control unit 11 sends the operation command request for requesting transmission of an operation command, to the destination URL for the operation command request contained in the service start information. The operation command represents operations to be executed by the MFP 10 to receive the service. For example, the operation command includes a command requesting the MFP 10 to start an inputting operation (an MFP side UI process) through the operation panel 40, a command requesting the MFP 10 to stop operations relating to the service, a command requesting the MFP 10 to start reading an original through the reading unit 13, and a command requesting the MFP 10 to start printing out images through the recording unit 14.

In step S104, the control unit 11 judges whether an operation command, which is a reply to the operation command request issued in step S103, is received from the function server 20. The control unit 11 waits until the operation command is received (S104: NO). If the operation command is received (S104: YES), control proceeds to step S105. As described later, operation commands are transmitted from the function server 20 to the MFP 10 in steps S505, S509 and S510 in the service process (see FIG. 7).

In step S105, the control unit 11 judges whether the operation command is a command for terminating the service. If the operation command is the command for terminating the service (S105: YES), control proceeds to step S106 where a termination process to terminate the service is executed.

If the operation command is not the command for terminating the service (S105: NO), control proceeds to step S107 where the control unit 11 judges whether the operation command is a command for initiating a UI process. If the operation command is the command for initiating the UI process (S107: YES), the control unit 11 initiates the MFP side UI process which is a process relating to a user operation through the operation panel 40 (S108). Then, control returns to step S103.

If the operation command is not the command for initiating the UI process (S107: NO), control proceeds to step S109 where another process for the operation command is executed. Then, control returns to step S103. Processes executed in step S109 include a judgment process in which the control unit 11 judges whether the operation command is a reading start command requesting the MFP 10 to start a reading process for reading an original through the reading unit 13, the reading process to be started when the control unit 11 judges that the operation command is the reading start command, a judgment process in which the control unit 11 judges whether the operation command is a print start command requesting the MFP 10 to start a printing process for printing out images through the recording unit 14, and the printing process to be started when the control unit 11 judges that the operation command is the print start command.

Figure 4:
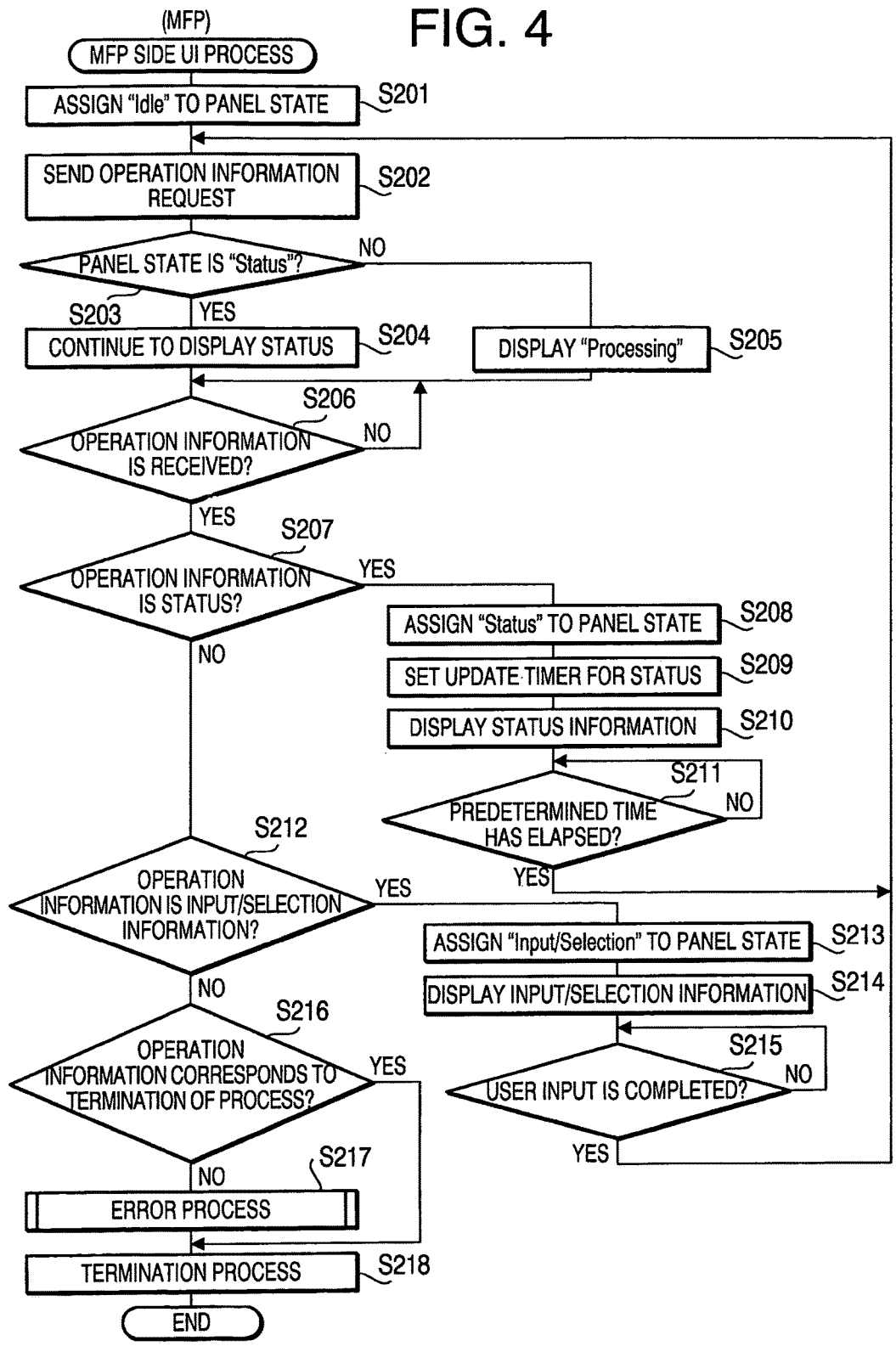
FIG. 4 is a flowchart illustrating an MFP side UI process executed under control of the MFP according to at least one aspect of the invention.

Hereafter, the MFP side UI process will be explained with reference to FIG. 4. The MFP side UI process is initiated in step S108 of the service usage process.

First, the control unit 11 assigns "Idle" representing an initial status to a variable "panel state" indicating the type of information being displayed on the display 40b of the operation panel 40 (step S201). Then, the control unit 11 sends an operation information request for requesting transmission of operation information from the function server 20. The operation information is information to be displayed on the display 40b of the operation panel 40, and is supplied to the MFP 10 from the function server 20. Information for instructing the MFP 10 to terminate processes running on the MFP 10 is also sent to the MFP 10 as the operation information. Hereafter, the operation information is frequently referred to as display data.

Next, in step S203, the control unit 11 judges whether a current value of the "panel state" is "Status". As described later, "Idle" is assigned to "panel state" at the start of the MFP side UI process, and thereafter "Status" is assigned to "panel state" when status information representing a status of the function server 20 is displayed on the display 40b (step S208). "Input/Select" is assigned to "panel state" when input/selection information, which is information for accepting inputs of commands or selections conducted through the input unit 40a of the operation panel 40, is displayed on the display 40b (S213).

If the control unit 11 judges that "panel state" is "Status" (i.e., when status information is displayed on the display 40b) (S203: YES), control proceeds to step S204 where the control unit 11 continues to display the status information. In other words, information displayed on the display 40b is not changed. Then, control proceeds to step S206.

If the control unit 11 judges that "panel state" is not "Status" (i.e., "panel state" is "Idle" or "Input/Select") (S203: NO), control proceeds to step S205 where a word "Processing" representing a waiting status for operation information is displayed on the display 40b. That is, in step S205, information on the display 40b is changed. Then, control proceeds to step S206.

In step S206, the control unit 11 judges whether operation information, which is sent from the function server 20 as a reply to the operation information request, is received. The control unit 11 waits until the operation information is received (S206: NO), If the operation information is received (S206: YES), control proceeds to step S207. As described later, the operation information is generated in step S605 of a serve side UI process (see FIG. 8) executed under control of the control unit 21 of the function server 20 and is sent to the MFP 10 which issued the operation information request (step S606).

In step S207, the control unit 11 judges whether the received operation information corresponds to status information. The operation information is classified into three types: status information; input/selection information; and termination information. The termination information is used to terminate a UI process. Since the operation information contains information for identifying an information type, the control unit 11 is able to make a judgment in step S207 in accordance with the information for identifying an information type.

If the control unit 11 judges that the operation information is status information (S207: YES), control proceeds to step S208 where "Status" is assigned to "panel state". Subsequently, an update timer is activated to measure time for update of the status information. Next, in step S210, the status information is displayed on the display 40b. Next, in step S211, the control unit 11 judges whether the measured time of the update timer reaches a predetermined time. Step S211 is repeated until the measured time reaches the predetermined time. If the predetermined time is reached (S211: YES), control returns to step S202 where an operation information request is sent to the function server 20.

In other words, in the sate where the status information is displayed on the display 40b, operation information requests are sent to the function server 20 at predetermined time intervals to monitor the status of the function server (i.e., a polling process is executed repeatedly).

If the control unit 11 judges that the operation information is not status information (S207: NO), control proceeds to step S212 where the control unit 11 judges whether the received operation information corresponds to input/selection information. If the operation information is input/selection information (S212: YES), control proceeds to step S213 where "Input/Select" is assigned to "panel state". Subsequently, the control unit 11 display the input/selection information on the display 40b (step S214).

Next, in step S215, the control unit 11 judges whether a user operation for inputting data and/or selecting data (hereafter, referred to as an input/section operation) to be conducted by a user through the operation panel 40 is finished. If the input/selection operation is finished (S215: YES), control returns to step S202 where an operation information request is sent to the function server 20. In this case, the operation information accompanied by the inputted and/or selected information is sent to the function server 20.

If the operation information is not the input/selection information (S212: NO), control proceeds to step S216 where the control unit 11 judges whether the operation information corresponds to a command for termination of a UI process. If the operation information does not correspond to a command for termination of a UI process (S216: NO), control proceeds to step S217 where an error process, which is described later, is executed.

After step S217 is processed or the control unit 11 judges that the operation information corresponds to a command for termination of a UI process (S216: YES), the termination process (S218) is executed. Then, the MFP side UI process terminates.

Figure 5:
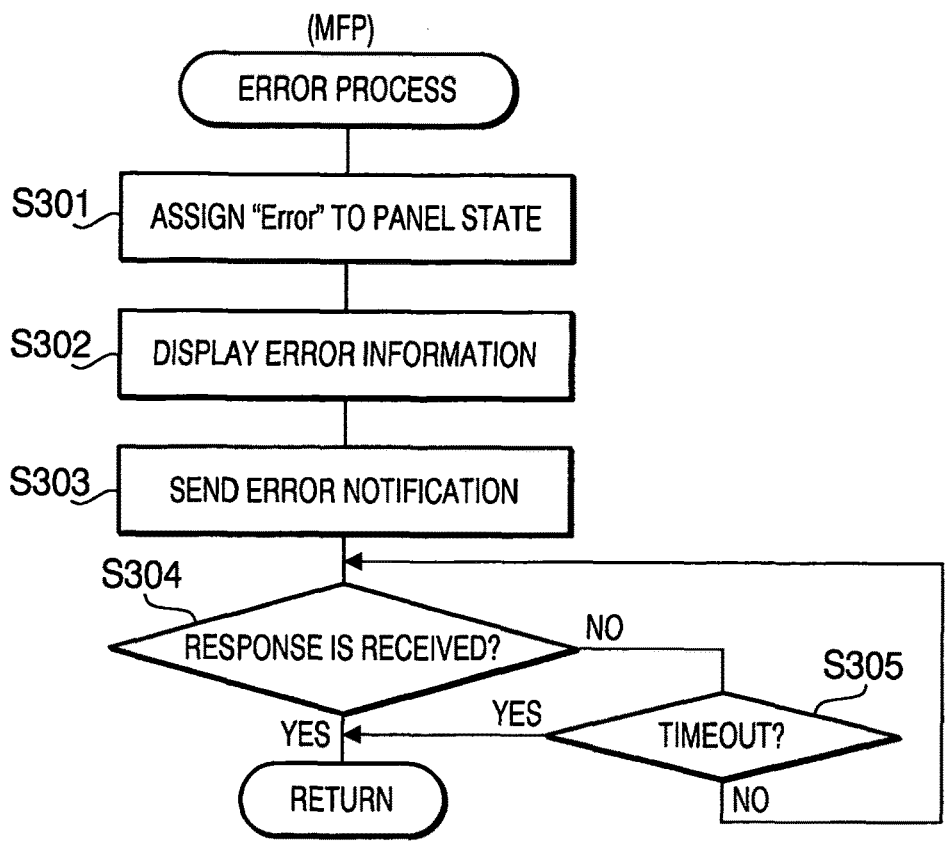
FIG. 5 is a flowchart illustrating an error process executed in the MFP side UI process.

FIG. 5 is a flowchart illustrating the error process executed in step S217 of the MFP side UI process. When the error process is initiated, a value "error" representing an error state is assigned to "panel state" (Step S301). Then, control unit 11 displays error information (e.g., a message indicating occurrence of error) on the display 40b (step S302).

Next, in step S303, the control unit 11 sends an error notification for notifying the function server 20 of occurrence of error, to the function server 20. Then, the control unit 11 judges whether a response which is transmitted from the function server 20 as a reply to the error notification is received. If the response is not received (S304: NO), control proceeds to step S305 where the control unit 11 judges whether a timeout occurs (i.e., a time during which the control unit 11 does not received the response reaches a predetermined time interval).

If the timeout does not occur (S305; NO), control returns to step S304. If the timeout occurs (S305: YES), or the control unit 11 receives the response (S304: YES), the error process terminates.

Figure 6:
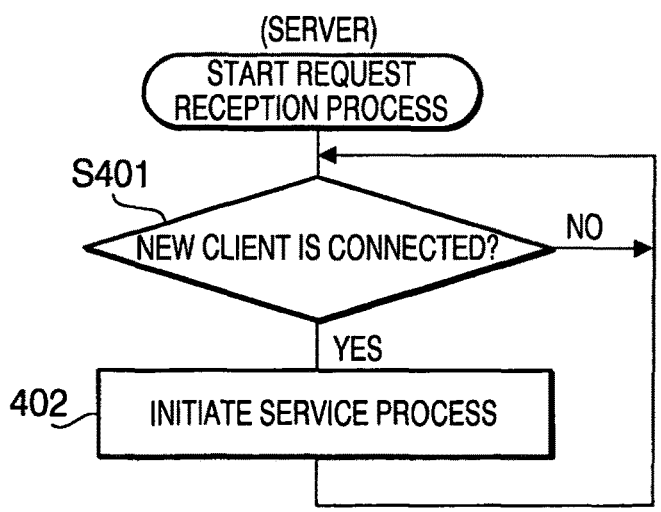
FIG. 6 is a flowchart illustrating a start request reception process executed under control of a function server according to at least one aspect of the invention.
Figure 7:
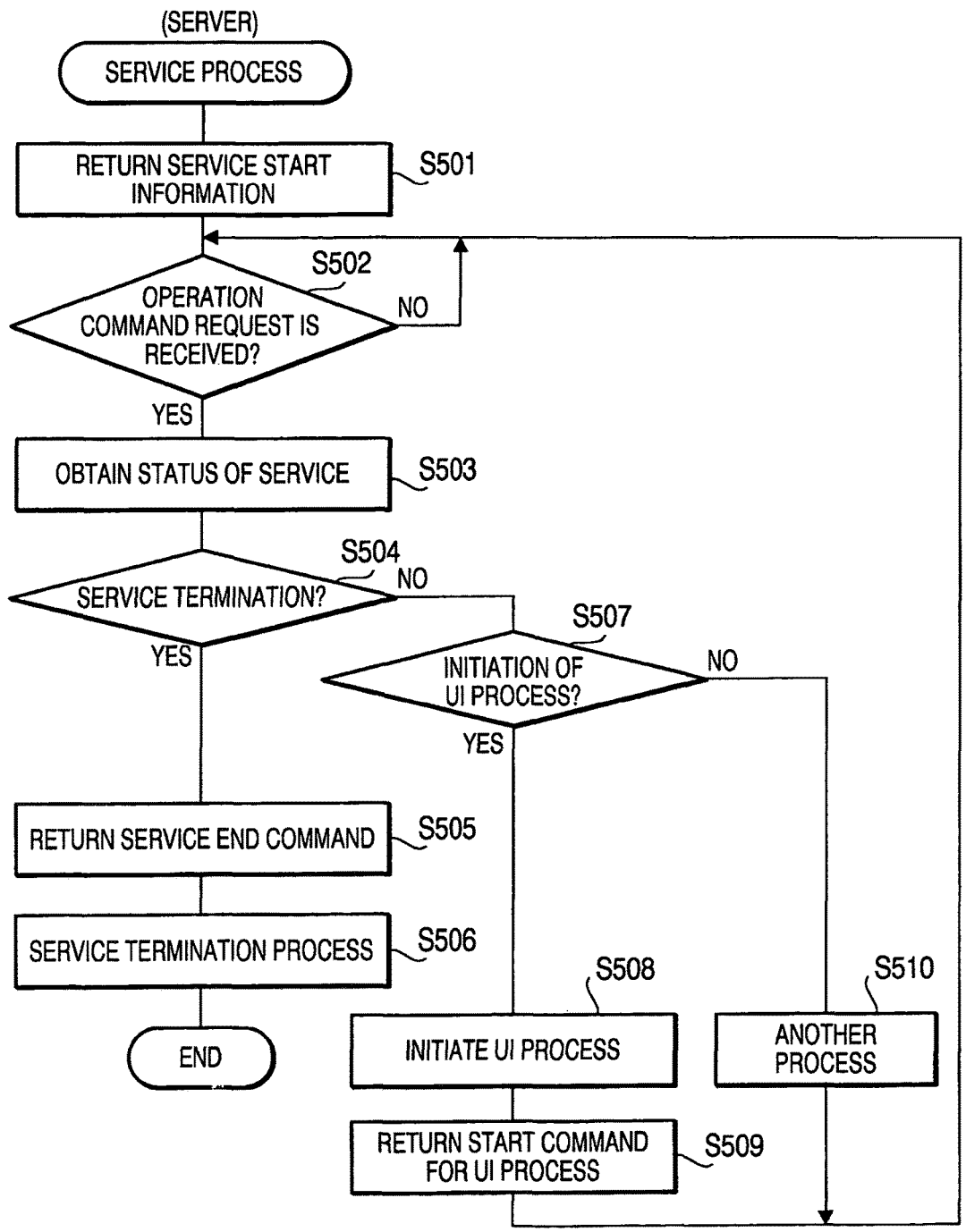
FIG. 7 is a flowchart illustrating a service process initiated in the start request reception process according to at least one aspect of the invention.

A start request reception process to be executed under control of the control unit 21 of the function server 20 will be explained with reference to FIG. 6. First, the control unit 21 judges whether a client is newly connected thereto (step S401). Specifically, in step S401, the control unit 21 judges that a new client is connected thereto if a service start request for starting a service is transmitted from the MFP 10. As described above, a service start request is issued by the MFP 10 in step S101 of the service usage process. In step S402, a service process shown in FIG. 7 is initiated. Then, control returns to step S401.

The service process initiated in step S402 of the start request reception process will be explained with reference to FIG. 7. The service process is executed under control of the control unit 21 of the function server 20. First, the control unit 21 sends service start information back to the MFP 10 whose service start request was received in step S401 of the start request reception process. The service start information includes a client ID which the function server 20 uses to identify a client, and a destination URL (representing a destination address of a target to which a request for a service is sent) for an operation command request.

Next, in step S502, the control unit 21 judges whether an operation command request from the MFP 10 is received. The control unit 21 waits until an operation command request is received (S502: NO). If an operation command request is received (S502: YES), control proceeds to step S503. The operation command request is issued by the MFP 10 in step S103 of the service usage process.

In step S503, the control unit 21 obtains a status (e.g., progress) of the service being provided by the function server 20. Then, the control unit 21 judges whether the status of the service indicates that the service is to be terminated (i.e., whether processes for the service have completed). If the status of the service indicates that the service is to be terminated (S504: YES), control proceeds to step S505 where the control unit 21 sends a service end command to the MFP 10 as a response to the operation command request.

Next, in step S506, a service termination process for terminating processes relating to the service is executed. Then, the service process terminates.

If the status of the service does not indicate that the service is to be terminated (S504: NO), control proceeds to step S507 where the control unit 21 judges whether the status of the service indicates that a UI process is to be initiated. For example, the status indicating that a UI process is to be initiated corresponds to the case where parameter setting is requested for execution of the service.

If the status of the service indicates that a UI process is to be initiated (S507: YES), control proceeds to step S508 where a server side UI process (see FIG. 8) is initiated. Next, in step S509, the control unit 21 sends a start command for initiating a UI process back to the MFP 10, as a response to the operation command request. Then, control returns to step S502.

If the status of the service does not indicate that a UI process is to be initiated (S507: NO), control proceeds to step S510 where another process is executed. Process to be executed in step S510 include a judgment process in which the control unit 21 judges whether the status of the service indicates that the MFP 10 needs to start a reading process for reading an original through the reading unit 13, a process in which the control unit 21 sends a start command for starting the reading process as a response to the operation command request if the control unit 21 judges that the reading process needs to be initiated, a judgment process in which the control unit 21 judges whether the status of the service indicates that the MFP 10 needs to start printing mages through the recording unit 14, and a process in which the control unit 21 sends a start command for starting a printing process as a response to the operation command request if the control unit 21 judges that the printing process needs to be initiated.

Figure 8:
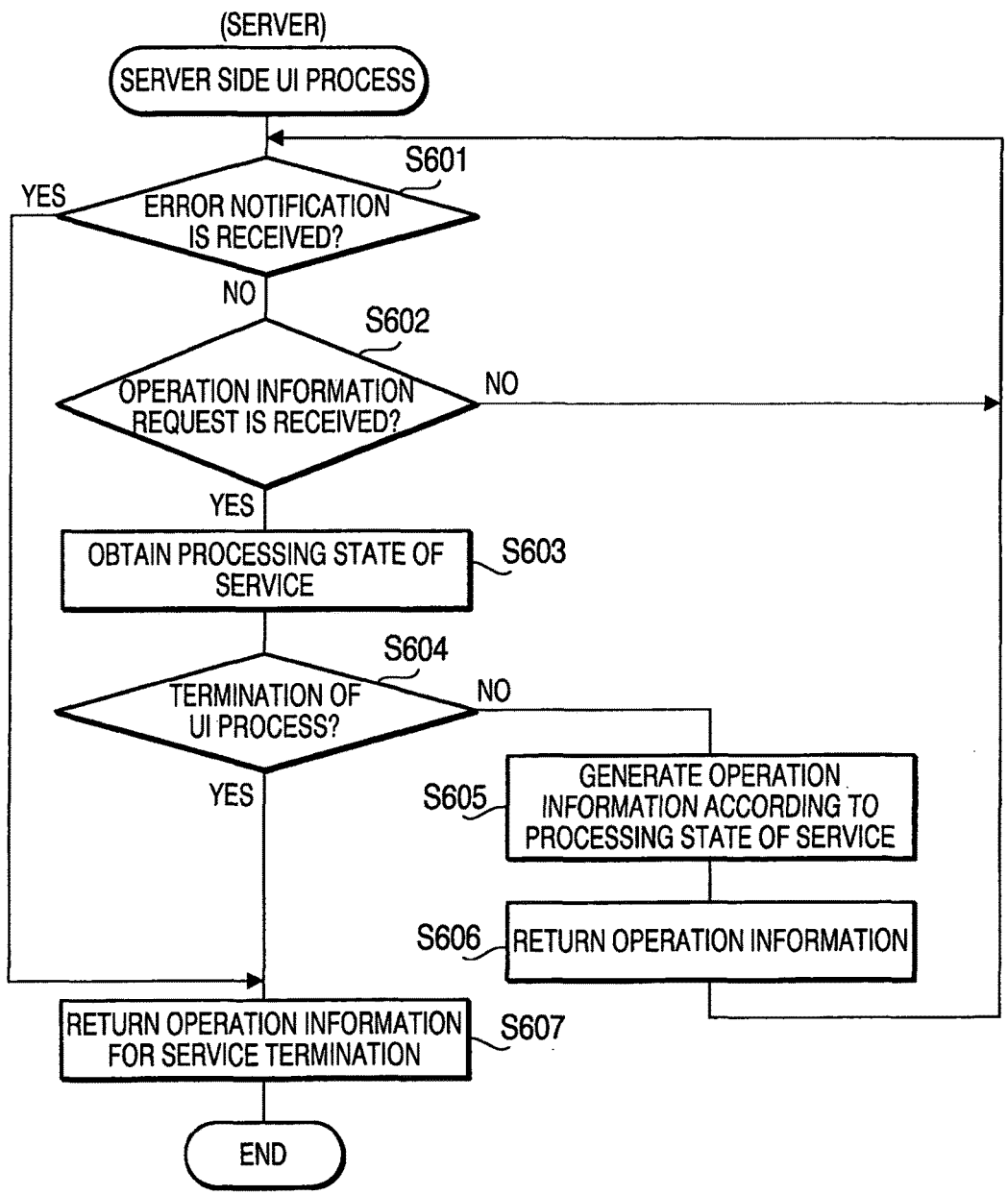
FIG. 8 is a flowchart illustrating a server side UI process executed under control of the function server according to at least one aspect of the invention.

Hereafter, the server side UI process to be executed under control of the control unit 21 of the function server 20 will be explained with reference to FIG. 8. First, the control unit 21 judges whether an error notification has been received (step S601). The error notification is issued by the MFP 10 in step S303 of the error process.

If the error notification has not been received (S601: NO), control proceeds to step S602 where the control unit 21 judges whether an operation information request has received. The operation information request is issued by the MFP 10 in step S202 of the MFP side UI process. If the operation information request has not been received (S602: NO), control returns to step S601. That is, the control unit 21 waits until the error notification or the operation information request is received. If the operation information request has been received (S602: YES), control proceeds to step S603 where the control unit 21 obtains a processing state of the service.

Next, in step S604, the control unit 21 judges whether the processing status obtained in step S603 indicates that a UI process needs to be terminated. If the processing status does not indicate that a UI process needs to be terminated (S604: NO), control proceeds to step S605 where the control unit 21 generates operation information in accordance with the processing state of the service obtained in step S603. More specifically, if the processing state indicates that status information needs to be displayed on the display 40b of the MFP 10 (e.g., if the processing state represents a waiting state), the control unit 21 generates operation information representing status information. If the processing state indicates that input/selection information needs to be displayed on the display 40b of the MFP 10 (e.g., if the processing state requests setting of parameters), the control unit 21 generates operation information representing input/selection information.

Next, in step S606, the control unit 21 sends the operation information generated in step S605 back to the MFP 10, as a response to the operation information request.

If the processing status indicates that a UI process needs to be terminated (S604: YES), control proceeds to step S607 where the control unit 21 sends operation information for terminating the service as a response. Then, the server side UI process terminates.

If the control unit 21 judges that the error notification is received (S601: YES), control proceeds to step S607 where the control unit 21 sends operation information for terminating the service as a response. Then, the server side UI process terminates.

Hereafter, examples of onscreen representation on the display 40b of the operation panel 40 will be described with reference to FIGS. 9A to 9D and 10A to 10C. The examples of onscreen representation on the display 40b of the MFP 10 are generated in accordance with the above mentioned processes of the MFP 10 and the function server 20. As shown in FIGS. 9A to 9D, the onscreen representation for the input/selection information has a hierarchical menu structure. It should be noted that each layer number is indicated in each of FIGS. 9A to 9D and 10A to 10C for convenience in explanation, and such a layer number is not actually displayed on the display 40b.

FIGS. 9A to 9D are examples of onscreen representation regarding the input/selection information. FIG. 9A illustrates a situation where a selection screen allowing a user to select an item from among items such as "Registration" is displayed on the display 40b (STATE A). The selection screen shown at the left side part of FIG. 9A corresponds to the top layer (layer 1). In the situation where the selection screen shown at the left side part of FIG. 9A is displayed (step S214), if an item "Registration" is selected through the direction keys 46 and 47 and the OK key 50 is pressed, the onscreen representation changes from the layer 1 to a lower layer (layer 2) where a selection screen allowing a user to select an item from among specific items relating to the item "Registration" (e.g., "User Name" or "Address") is displayed (see the central part of FIG. 9A).

In the situation where the selection screen shown at the central part of FIG. 9A is displayed, if an item is selected through the direction keys 46 and 47 and the OK key 50 is pressed, the onscreen representation changes from the layer 2 to a lower layer (layer 3) where an input screen allowing a user to input information regarding the item selected in the higher layer is displayed. For example, if the item "Address" is selected and then the OK key 50 is pressed, an input screen for inputting an address is displayed (layer 3). In the case where an address (e.g., "aichi") is inputted by a user, for example, through dial keys on the input screen for inputting an address and then the OK key 50 is pressed, the onscreen representation changes back to the layer 2 if the input of essential information (e.g., User Name) has not been completed, while the inputted and selected information is sent from the MFP 10 to the function server 20 together with the operation information if the input of essential information has been completed (S215: YES, S202). Then, the MFP 10 changes to a waiting state for operation information.

In this stage, information indicating that the MFP 10 is in a waiting state is displayed on the display 40b (S203: NO, S205). For example, a word "Processing" which is stored in the MFP 10 in advance may be displayed as the information representing the waiting state on the display 40b, as shown in FIG. 9B (STATE B). That is, when the MFP 10 changes to a waiting state, onscreen representation on the display 40b also changes.

After the operation information is received (S206: YES), the received operation information is displayed on the display 40b of the operation panel 40 as shown in FIG. 9C (STATE C). That is, onscreen representation is changed by the reception of the operation information. In this case, a selection screen allowing a user to select an item from among items of service types (e.g., "Service 1" and "Service 2") is displayed on the display 40b. If an item "Service 1" is selected though the upward and downward direction keys 46 and 47 on the selection screen, onscreen representation for selection changes to a lower layer (layer 2) where a selection screen allowing a user to select an item from among specific items (e.g., "Application 1" and "Application 2") is displayed.

In this situation, if the item "Application 1" is selected through the upward and downward keys 46 and 47 and then the OK key 50 is pressed (S215: YES), information on the selected item is sent from the MFP 10 to the function server 20 together with the operation information request (S202). Then, the MFP 10 changes to a waiting state for operation information. In the waiting state, information indicating that the MFP 10 is in a waiting state is displayed on the display 40b (S203: NO, S205). For example, a word "Processing" may be displayed as the information representing the waiting state are displayed on the display 40b, as shown in FIG. 9C (STATE C). That is, when the MFP 10 changes to a waiting state, onscreen representation on the display 40b also changes.

FIGS. 10A to 10C are examples of onscreen representation regarding the status information. As shown in FIG. 10A (STATE A), in the case where a word "Scanning" is displayed on the display 40b of the operation panel 40 as information representing a status of the function server 20 (i.e., information indicating that a reading process for reading an image from an original is running) (S210), an operation information request is repeatedly sent from the MFP 10 to the function server 20 at predetermined time intervals (S211: YES, S202). It should be noted that although the MFP 10 changes to a waiting state after sending the operation information request, the onscreen representation of "STATE A" (FIG. 10A) is maintained as shown in FIG. 10B (S203: YES, S204). That is, even if the MFP 10 changes to the waiting state, the onscreen representation on the displayed 40b is not changed.

If operation information is received after sending the operation information request (S206: YES), the received operation information is displayed on the display 40b. More specifically, if the operation information indicates that the function server 20 is in a reading process for reading an image from an original, information representing such a state of the function server 20 (e.g., "Scanning") is displayed on the display 40b (S210). If the operation information indicates that the function server 20 is in a translating process for translating text information of the read image, information representing such a state of the function server 20 (e.g., "Translating") is displayed on the display 40b (S210) as shown in FIG. 10C. That is, as long as the state of the function server 20 is not changed, the previously displayed onscreen representation is maintained. On the other hand, if the state of the function server 20 is changed, the onscreen representation is updated.

As described above, according to the embodiment, if the information displayed on the display 40*b* of the operation panel 40 is the input/selection information, the word "Processing" representing the waiting state is displayed on the display 40*b* of the operation panel 40 when the MFP 10 sends the operation information request to the function server 20 (i.e., when the MFP 10 changes to the waiting state for operation information) (S203: NO, S205). On the other hand, in the case where the status information is displayed on the display 40*b* of the operation panel 40, the onscreen representation of the status information is maintained even if the operation information request is sent to the function server (i.e., even if the MFP 10 changes to the waiting state for the operation information) (S203: YES, S204).

As described above, according to the embodiment, it is possible to prevent the essential function of displaying operation information on the MFP 10 from being deteriorated, while also preventing a user from becoming anxious about the essential function of displaying operation information.

Specifically, in the state where the input/selection information is displayed, switching of the MFP 10 to the waiting state is recognizable because such switching is notified to the user by changing information on the display at a time when operation for the input/selection information is completed (i.e., when the operation information request and the inputted/selected information is sent to the function server 20). Therefore, such a configuration prevents the MFP 10 (a data receiving device) from becoming unable to notify a use of the fact that the MFP 10 is in the waiting state even if the MFP 10 has changed to the waiting state.

In addition, the onscreen representation regarding the input/selection information is not switched regardless of a user's intention, except when the onscreen representation is switched by a timeout. It is understood such a configuration also prevents the essential function of displaying operation information from being deteriorated by switching of onscreen representation.

On the other hand, in the case where status information is displayed, the onscreen representation is not switched even when the MFP 10 changed to the waiting state. Therefore, it is possible to prevent the essential function of displaying status information from being deteriorated by switching of onscreen representation. Since the MFP 10 is configured to obtain status information by a polling operation, the MFP 10 is required to frequently inquire the status of the function server 20 and therefore the frequency of changing to the waiting sate becomes high. On this point of view, the MFP 10 is configured not to switch the onscreen representation when the status information is displayed. It is understood that such a configuration enhances the advantage of preventing the essential function of displaying status information from being deteriorated by switching of onscreen representation.

In addition, in the case where the status information is displayed, the MFP 10 changes to the waiting state regardless of the user's intention. In this case, the necessity for notifying the user of the occurrence of the switching to the waiting state is low. Therefore, according to the embodiment, it is possible to prevent a user from becoming anxious about the essential function of displaying information.

Although the present invention has been described in considerable detail with reference to certain preferred embodiments thereof, other embodiments are possible.

In the communication system 100, the MFP 10 is configured to send a request and the function server 20 is configured to respond to the request issued by the MFP 10. However, the present invention can be applied to various types of communication systems.

In the above mentioned embodiment, the MFP 10 having more than one functions is employed as a data receiving device. However, a device having a single function, such as a printer, a facsimile device or a copier may be employed as a data receiving device. An information processing device may also be employed as a data receiving device.

What is claimed is:

1. A communication system in which a data sending device and a data receiving device are to be connected to each other, the data sending device having a function of sending display data representing a screen to be displayed to the data receiving device and the data receiving device having a function of receiving the display data from the data sending device, wherein the data receiving device comprises:
    a display unit configured to display:
        an input screen indicating information for input or selection by a user,
        a status screen indicating a status of an operation currently being performed by the data sending device, and
        a waiting state screen indicating that the data receiving device is waiting for the data sending device to perform or continue performing an operation;
    an input unit configured to obtain the information input or selected by the user;
    a data receiving unit configured to receive first display data and screen type identification information from the data sending device prior to receiving second display data, the first display data representing a first screen, the screen type identification information identifying whether the first screen represented by the first display data is the input screen or the status screen, and the second display data representing a second screen; and
    a display control unit configured to:
        display the first screen on the display unit according to the first display data received from the data sending device;
        determine whether the first screen represented by the first display data is the input screen or the status screen based on the screen type identification information received from the data sending device;
        if it is determined that the first screen is the input screen:
            display the waiting state screen on the display unit instead of the first screen when the data receiving device enters a waiting state to wait for receipt of the second display data from the data sending device, and
            display the second screen according to the second display data on the display unit instead of the waiting state screen after the data receiving device receives the second display data; and
        if it is determined that the first screen is the status screen:
            continue displaying the first screen on the display unit without displaying the waiting state screen until the second display data is received when the data receiving device enters the waiting state to wait for receipt of the second display data from the data sending device; and
            display the second screen according to the second display data on the display unit instead of the first screen after the data receiving device receives the second display data.

2. The communication system according to claim 1,
wherein the data receiving device further comprises a data request control unit configured to perform a request process for requesting the data sending device to transmit the second display data, and
wherein the waiting state of the data receiving device corresponds to a state in which the request process is performed when the first display data represents the input screen.

3. The communication system according to claim 1, wherein:
the data receiving device further comprises a memory in which status display data representing the status screen is stored in advance,
the status display data is not obtained from the data sending device, and
the display control unit is further configured to, if it is determined that the first screen is the input screen, read out the status display data from the memory so as to display the waiting screen on the display unit when the data receiving device enters the waiting state to wait for receipt of the second display data from the data sending device.

4. A communication device comprising:
a display unit configured to display:
an input screen indicating information for input or selection by a user,
a status screen indicating a status of an operation currently being performed by an external device, and
a waiting state screen indicating that the communication device is waiting for the external device to perform or continue performing an operation;
an input unit configured to obtain the information input or selected by the user;
a processor configured to:
receive first display data and screen type identification information from the external device prior to receiving second display data, the first display data representing a first screen, the screen type identification information identifying whether the first screen represented by the first display data is the input screen or the status screen, and the second display data representing a second screen;
display the first screen on the display unit according to the first display data received from the external device;
determine, based on the screen type identification information received from the external device, whether the first screen represented by the first display data is the input screen or the status screen;
if it is determined that the first screen is the input screen:
display the waiting state screen instead of the first screen on the display unit when the communication device enters the waiting state to wait for receipt of the second display data from the external device, and
display the second screen according to the second display data on the display unit instead of the waiting state screen after the communication device receives the second display data; and
if it is determined that the first screen is the status screen:
continue displaying the first screen on the display unit without displaying the waiting state screen until the second display data is received when the communication device enters a waiting state to wait for receipt of the second display data from the external device; and
display the second screen according to the second display data on the display unit instead of the first screen after the communication device receives the second display data.

5. The communication device according to claim 4,
wherein the processor is further configured to request the external device to transmit the second display data in a case where it is determined that the first display data represents the input screen based on the screen type identification information, and thereafter, display the waiting state screen on the display unit instead of the input screen until the second display data is received, and
wherein the processor is further configured to request the external device to transmit the second display data in a case where it is determined that the first display data represents the status screen based on the screen type identification information, and continue displaying the status screen on the display unit without displaying the waiting state screen until the second display data is received.

6. The communication device according to claim 4, wherein:
the communication device further comprises a memory in which status display data representing the status screen is stored in advance,
the status display data is not obtained from the external device, and
the processor is further configured to, if it is determined that the first screen is the input screen, read out the status display data from the memory so as to display the waiting screen on the display unit when the communication device enters the waiting state to wait for receipt of the second display data from the external device.

7. A non-transitory computer-readable medium storing instructions which, when executed, cause a processor to:
receive first display data and screen type identification information from an external device prior to receiving second display data, the first display data representing a first screen, the screen type identification information identifying whether the first screen represented by the first display data is an input screen or a status screen, and the second display data representing a second screen;
display the first screen on a display unit based on the first display data received from the external device, the input screen indicating information for input or selection by a user;
determine, based on the screen type identification information received from the external device, whether the first screen represented by the first display data is the input screen or the status screen, the status screen indicating a status of an operation currently being performed by the external device;
enter a waiting state in which the processor waits to receive second display data from the external device; and
if it is determined that the first screen is the input screen:
display a waiting state screen instead of the first screen on the display unit when the processor enters a waiting state to wait for receipt of the second display data from the external device, the waiting state screen indicating that the processor is waiting for the external device to perform or continue performing an operation, and display the second screen according to the second display data on the display unit instead of the waiting state screen after the communication device receives the second display data; and if it is determined that the first screen is the status screen:

continue to display the first screen on the display unit without displaying the waiting state screen until the second display data is received when the processor enters the waiting state to wait for receipt of the second display data from the external device; and display the second screen according to the second display data on the display unit instead of the first screen after the communication device receives the second display data.

8. The non-transitory computer-readable medium according to claim 7, wherein the instructions further cause the processor to request the external device to transmit the second display data in a case where it is determined that the first display data represents the input screen based on the screen type identification information, and thereafter, display the waiting state screen on the display unit instead of the input screen until the second display data is received, and wherein the instructions further cause the processor to request the external device to transmit the second display data in a case where it is determined that the first display data represents the status screen based on the screen type identification information, and continue displaying the status screen on the display unit without displaying the waiting state screen until the second display data is received.

9. The non-transitory computer-readable medium according to claim 7, wherein:

the status display data representing the status screen is stored in a memory in advance, the status display data is not obtained from the external device, and the display control unit is further configured to, if it is determined that the first screen is the input screen, read out the status display data from the memory so as to display the waiting screen on the display unit when the processor enters the waiting state to wait for receipt of the second display data from the external device.

* * * * *

UNITED STATES PATENT AND TRADEMARK OFFICE
CERTIFICATE OF CORRECTION

PATENT NO. : 10,051,083 B2
APPLICATION NO. : 11/403208
DATED : August 14, 2018
INVENTOR(S) : Makoto Matsuda et al.

Page 1 of 1

It is certified that error appears in the above-identified patent and that said Letters Patent is hereby corrected as shown below:

On the Title Page

Item (56), FOREIGN PATENT DOCUMENTS, Line 2, please change "JP 160829 6/1997" to --JP H09-160829 6/1997--.

Signed and Sealed this
Sixteenth Day of April, 2019

Andrei Iancu
*Director of the United States Patent and Trademark Office*